US012372895B2

(12) United States Patent
Harada

(10) Patent No.: US 12,372,895 B2
(45) Date of Patent: Jul. 29, 2025

(54) IMAGE FORMING APPARATUS

(71) Applicant: KYOCERA Document Solutions Inc., Osaka (JP)

(72) Inventor: Yuzo Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/783,238

(22) Filed: Jul. 24, 2024

(65) Prior Publication Data

US 2025/0036042 A1 Jan. 30, 2025

(30) Foreign Application Priority Data

Jul. 26, 2023 (JP) ................................ 2023-121612

(51) Int. Cl.
*G03G 15/08* (2006.01)
*G03G 15/00* (2006.01)
*G03G 21/16* (2006.01)

(52) U.S. Cl.
CPC ....... *G03G 15/0813* (2013.01); *G03G 15/751* (2013.01); *G03G 21/1647* (2013.01)

(58) Field of Classification Search
CPC ............. G03G 15/751; G03G 15/0813; G03G 21/1647
See application file for complete search history.

(56) References Cited

U.S. PATENT DOCUMENTS

2005/0232654 A1* 10/2005 Karakama .......... G03G 15/0894 399/109
2023/0040944 A1 2/2023 Harada
2023/0418207 A1* 12/2023 Kainuma ........... G03G 21/0076
2023/0418210 A1* 12/2023 Mori .................. G03G 21/1619

FOREIGN PATENT DOCUMENTS

JP 2023023110 A 2/2023

* cited by examiner

*Primary Examiner* — David H Banh
(74) *Attorney, Agent, or Firm* — IP Business Solutions, LLC.

(57) ABSTRACT

An image forming apparatus includes a photoconductor housing that supports a photoconductor drum so as to rotate about a shaft, a developing housing that supports a developing roller, so as to rotate about a shaft, a first contact member provided on an end portion of the photoconductor housing in an axial direction, and a second contact member provided on an end portion of the developing housing in the axial direction, and configured to make contact with the first contact member. The photoconductor housing includes a first bonding projection, projecting outward from the end portion in the axial direction. The first contact member includes a first elongate slot, longer than a diameter of the first bonding projection in a back-and-forth direction, and is fixed to the photoconductor housing, by bonding the first bonding projection, inserted through the first elongate slot, to the first contact member.

10 Claims, 10 Drawing Sheets

IMAGE FORMING APPARATUS

INCORPORATION BY REFERENCE

This application claims priority to Japanese Patent Application No. 2023-121612 filed on Jul. 26, 2023, the entire contents of which are incorporated by reference herein.

BACKGROUND

The present disclosure relates to an image forming apparatus.

In the case of an image forming apparatus based on electrophotography, it is important to maintain a clearance between a developing roller and a photoconductor drum uniform, over the entire length along the axial direction. For example, an image forming apparatus is known that includes a first contact member, provided on each end portion in the axial direction, of a photoconductor housing supporting the photoconductor drum, and a second contact member provided on each end portion in the axial direction, of a developing housing supporting the developing roller, and located in contact with the first contact member. The first contact member and the second contact member each include a plurality of elongate slots, and fixed to the corresponding housing with a screw, via the plurality of elongate slots. The positions of the first contact member and the second contact member are adjusted along the longitudinal direction of the plurality of elongate slots.

SUMMARY

The disclosure proposes further improvement of the foregoing techniques.

In an aspect, the disclosure provides an image forming apparatus including a photoconductor drum, a photoconductor housing, a developing roller, a developing housing, a pair of first contact members, and a pair of second contact members. The photoconductor drum retains a latent image. The photoconductor housing supports the photoconductor drum so as to rotate about a shaft. The developing roller retains a developing agent. The developing housing supports the developing roller, so as to oppose the photoconductor drum, and to rotate about a shaft. The pair of first contact members are provided on respective end portions of the photoconductor housing in an axial direction, in which the photoconductor drum extends. The pair of second contact members are provided on respective end portions of the developing housing in the axial direction, and make contact with the respective first contact members, by pressing the developing housing toward the photoconductor housing. The photoconductor housing includes a pair of first bonding projections, projecting outward from the respective end portions in the axial direction. The first contact member includes a first elongate slot, longer than a diameter of the first bonding projection in a back-and-forth direction, parallel to a straight line connecting an axial center of the photoconductor drum and an axial center of the developing roller. The first contact member is fixed to the photoconductor housing, by bonding the first bonding projection, inserted through the first elongate slot, to the first contact member.

In another aspect, the disclosure provides an image forming apparatus including a photoconductor drum, a photoconductor housing, a developing roller, a developing housing, a pair of first contact members, and a pair of second contact members. The photoconductor drum retains a latent image. The photoconductor housing supports the photoconductor drum so as to rotate about a shaft. The developing roller retains a developing agent. The developing housing supports the developing roller, so as to oppose the photoconductor drum, and to rotate about a shaft. The pair of first contact members are provided on respective end portions of the photoconductor housing in an axial direction, in which the photoconductor drum extends. The pair of second contact members are provided on respective end portions of the developing housing in the axial direction, and make contact with the respective first contact members, by pressing the developing housing toward the photoconductor housing. The developing housing includes a pair of second bonding projections, projecting outward from the respective end portions in the axial direction. The second contact member includes a second elongate slot, longer than a diameter of the second bonding projection in a back-and-forth direction, parallel to a straight line connecting an axial center of the photoconductor drum and an axial center of the developing roller. The second contact member is fixed to the developing housing, by bonding the second bonding projection, inserted through the second elongate slot, to the second contact member.

In still another aspect, the disclosure provides an image forming apparatus including a photoconductor drum, a photoconductor housing, a developing roller, a developing housing, a pair of first contact members, and a pair of second contact members. The photoconductor drum retains a latent image. The photoconductor housing supports the photoconductor drum so as to rotate about a shaft. The developing roller retains a developing agent. The developing housing supports the developing roller, so as to oppose the photoconductor drum, and to rotate about a shaft. The pair of first contact members are provided on respective end portions of the photoconductor housing in an axial direction, in which the photoconductor drum extends. The pair of second contact members are provided on respective end portions of the developing housing in the axial direction, and make contact with the respective first contact members, by pressing the developing housing toward the photoconductor housing. The photoconductor housing includes a pair of first bonding projections, projecting outward from the respective end portions in the axial direction. The developing housing includes a pair of second bonding projections, projecting outward from the respective end portions in the axial direction. The first contact member includes a first elongate slot, longer than a diameter of the first bonding projection in a back-and-forth direction, parallel to a straight line connecting an axial center of the photoconductor drum and an axial center of the developing roller. The second contact member includes a second elongate slot, longer than a diameter of the second bonding projection in the back-and-forth direction. The first contact member is fixed to the photoconductor housing, by bonding the first bonding projection, inserted through the first elongate slot, to the first contact member, and the second contact member is fixed to the developing housing, by bonding the second bonding projection, inserted through the second elongate slot, to the second contact member.

DETAILED DESCRIPTION

Figure 1:
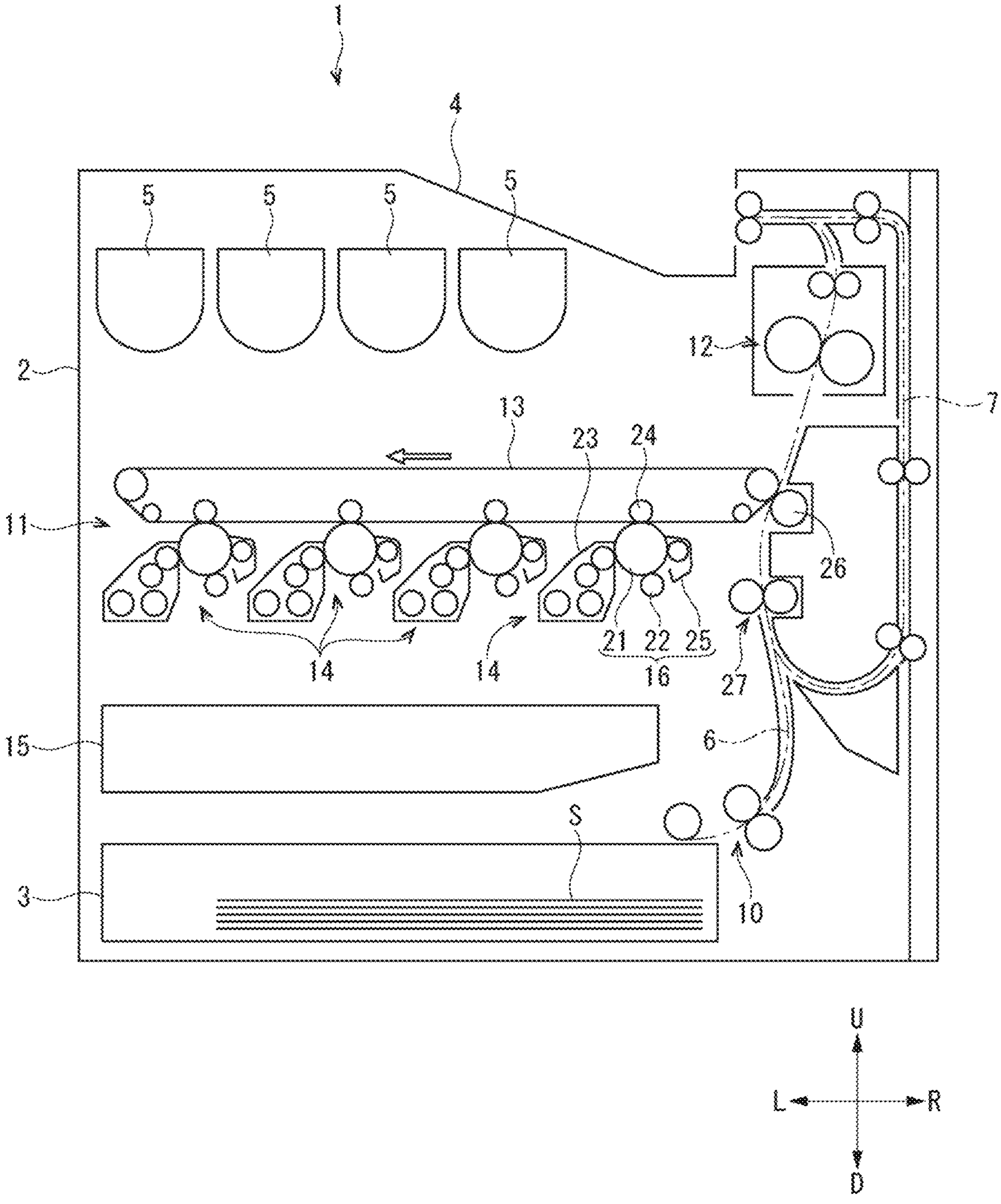
FIG. 1 is a front cross-sectional view schematically showing an internal structure of an image forming apparatus according to an embodiment of the disclosure.

Hereafter, an image forming apparatus according to an embodiment of the disclosure will be described, with reference to the accompanying drawings. Reference codes Fr, Rr, L, R, U, and D in the drawings respectively stand for the front, rear, left, right, upper, and lower sides. The terms hereinafter used to indicate directions and positions are merely for the sake of convenience in description, and not intended to limit the technical scope of the disclosure.

Image Forming Apparatus

Referring to FIG. 1, the image forming apparatus 1 according to the embodiment will be described hereunder. FIG. 1 is a front cross-sectional view schematically showing an internal structure of the image forming apparatus 1.

The image forming apparatus 1 is a color printer that transfers a full-color toner image, formed through an electrophotographic process, onto a sheet S (medium), thereby forming an image. The image forming apparatus 1 includes a main body 2 constituting a generally rectangular parallelepiped outer shell. A cassette 3 for storing the sheets S is removably mounted in the lower portion of the main body 2, and an output tray 4, to which the sheet S having the image formed thereon is delivered, is provided on the upper face of the main body 2. On the lower side of the output tray 4, four toner containers 5, respectively containing toner (developing agent) of four colors, namely magenta, cyan, yellow, and black, are removably mounted. Here, the medium is not limited to the sheet S made of paper, but may be, for example, a sheet made of a resin.

On the right side of the inner space of the main body 2, a transport route 6 and a reverse transport route 7, along which the sheet S is to be transported, are provided. The transport route 6 is formed in generally S-shape along the up-down direction, to transport the sheet S from the cassette 3 as far as the output tray 4. The reverse transport route 7 is branched from the transport route 6 to the right at a position on the downstream side thereof, and extends downward. Then the reverse transport route 7 merges with the transport route 6, at a position on the upstream side thereof. The reverse transport route 7 is used to turn over the sheet S and again transport to an image forming device 11, to be subsequently described. Here, the terms "upstream" and "downstream" herein used refer to the "upstream side" and "downstream side" from the viewpoint of the transport direction of the sheet S (medium).

Inside the main body 2, a sheet feeding device 10, the image forming device 11, and a fixing device 12 are provided. The sheet feeding device 10 is located at the upstream end of the transport route 6, and serves to separately draw out the sheets S one by one from the cassette 3, and deliver the sheets S to the transport route 6. The fixing device 12 is located on the downstream side of the transport route 6, and serves to heat the toner image on the sheet S with pressure, thereby thermally fixing the toner image onto the sheet S. The image forming device 11 is provided between the sheet feeding device 10 and the fixing device 12, on the transport route 6.

Image Forming Device

The image forming device 11 includes an intermediate transfer belt 13, four image forming units 14, and an optical scanning device 15. The intermediate transfer belt 13 is located on the lower side of the toner containers 5, stretched around a plurality of rollers, and revolves in the direction indicated by an arrow in FIG. 1. The four image forming units 14 are respectively associated with the toner of the four colors, and aligned in the left-right direction on the lower side of the intermediate transfer belt 13. The optical scanning device 15 is located on the lower side of the image forming unit 14. Here, the four image forming units 14 all have the same structure, and therefore only one of the image forming units 14 will be described hereunder.

The image forming unit 14 includes a photoconductor unit 16, a developing device 23, and a primary transfer roller 24. The photoconductor unit 16 includes a photoconductor drum 21, a charging device 22, and a cleaning device 25. The photoconductor drum 21 rotates about the shaft, in contact with the lower face of the intermediate transfer belt 13. The charging device 22, the developing device 23, the primary transfer roller 24, and the cleaning device 25 are located around the photoconductor drum 21, in the order of the image forming process. The primary transfer roller 24 is opposed to the photoconductor drum 21 from above, via the intermediate transfer belt 13. A secondary transfer roller 26 is in contact with the right end portion of the intermediate transfer belt 13, thereby defining a transfer nip. A resist roller pair 27 is provided on the upstream side of the secondary transfer roller 26.

Image Forming Operation

Hereunder, an operation of the image forming apparatus 1 will be described. A non-illustrated controller executes the image forming operation as follows, for example on the basis of image data inputted from an external terminal device.

The charging device 22 electrically charges the surface of the photoconductor drum 21. The optical scanning device 15 irradiates the photoconductor drum 21 with light, thereby forming a latent image based on the image data, on the surface of the photoconductor drum 21. The developing device 23 develops the latent image on the surface of the photoconductor drum 21 into a toner image, using the toner supplied from the toner container 5. The toner images of the four colors, respectively retained by the four photoconductor drums 21, are sequentially transferred, as primary transfer, to the revolving intermediate transfer belt 13 via the primary transfer roller 24 to which a primary transfer bias has been applied. The intermediate transfer belt 13 retains, by revolving, a full-color toner image, formed by overlaying the toner images of the four colors on each other. The cleaning device

25 removes the toner remaining on the surface of the photoconductor drum 21, after the primary transfer.

The sheet feeding device 10 draws out the sheet S stored in the cassette 3, and delivers the sheet S to the transport route 6. The resist roller pair 27 temporarily blocks the sheet S, thereby correcting the skew, and then delivers the sheet S to the downstream side. The secondary transfer roller 26, to which a secondary transfer bias has been applied, transfers, as secondary transfer, the toner image on the intermediate transfer belt 13, to the surface of the sheet S passing the transfer nip. The fixing device 12 heats the toner image transferred to the sheet S with pressure, thereby thermally fixing the toner image onto the sheet S. In the case of simplex printing, the sheet S on which the toner image has been fixed (the image has been formed) is delivered to the output tray 4.

In the case of duplex printing, the sheet S that has passed the fixing device 12 is switched back at the downstream end portion of the transport route 6, and delivered to the reverse transport route 7. The sheet S transported along the reverse transport route 7 again proceeds into the transport route 6, and an image is formed also on the back face of the sheet S, through the same process as the simples printing.

Figure 2:
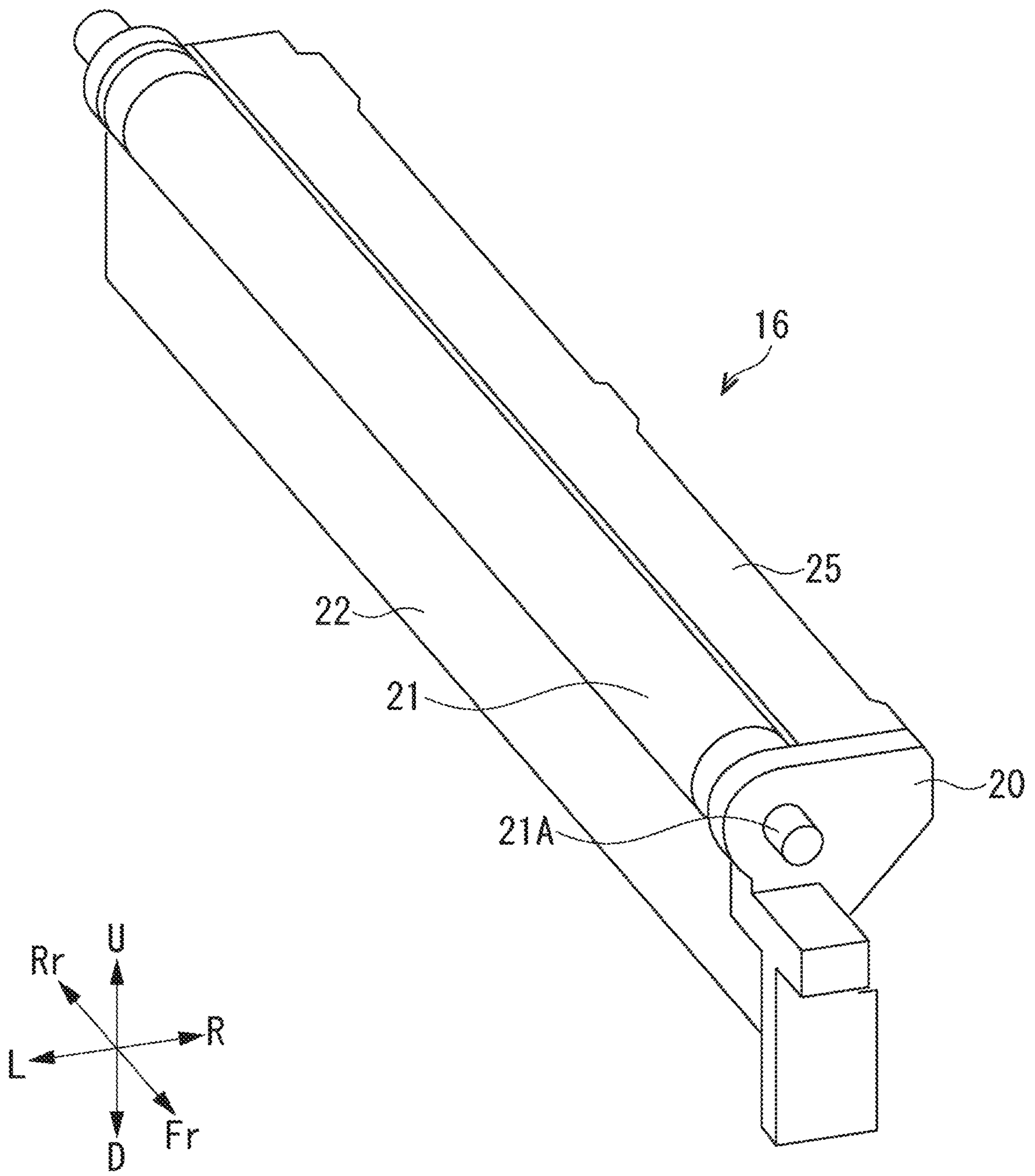
FIG. 2 is a perspective view showing a photoconductor unit according to the embodiment of the disclosure.
Figure 3:
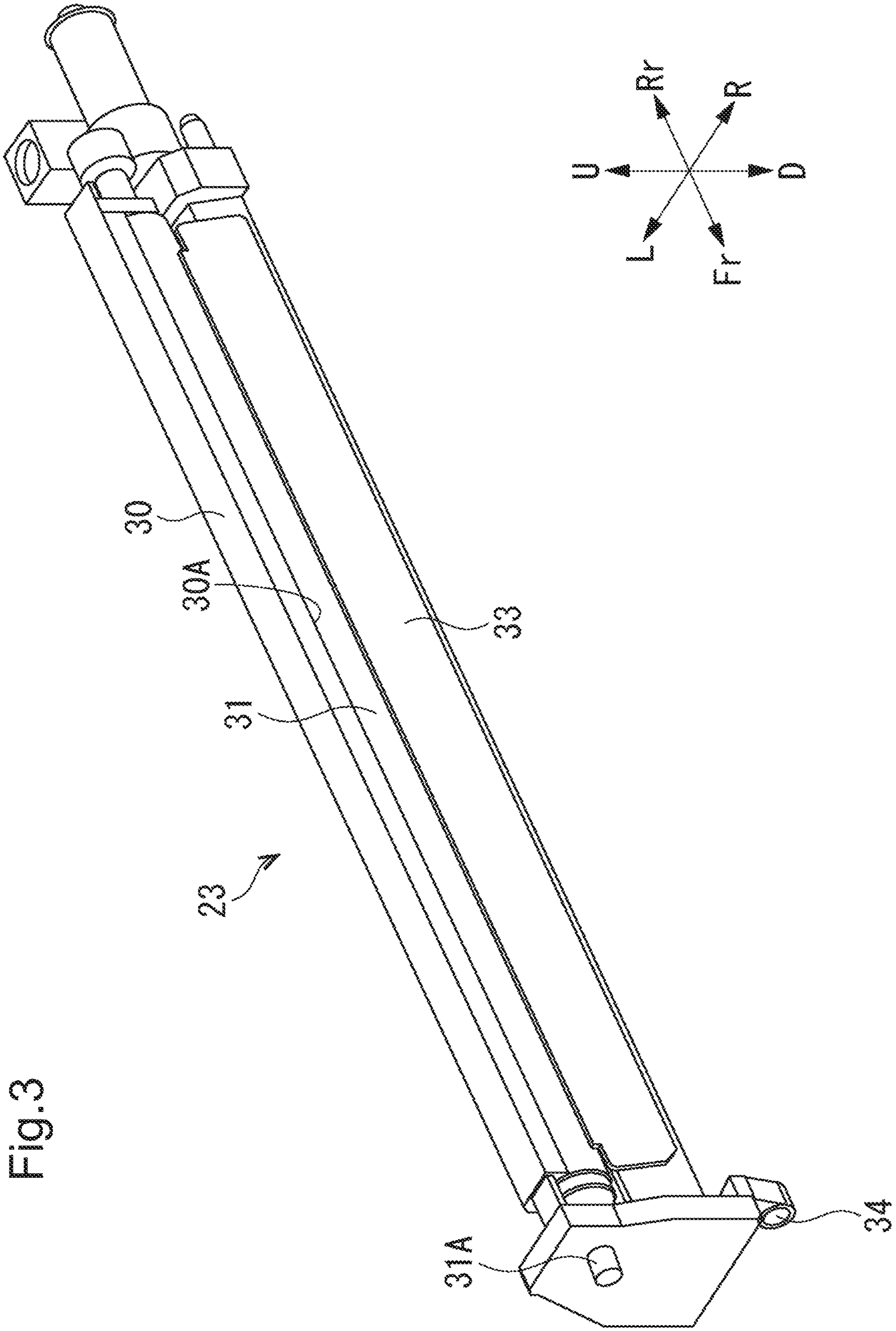
FIG. 3 is a perspective view showing a developing device according to the embodiment of the disclosure.
Figure 4:
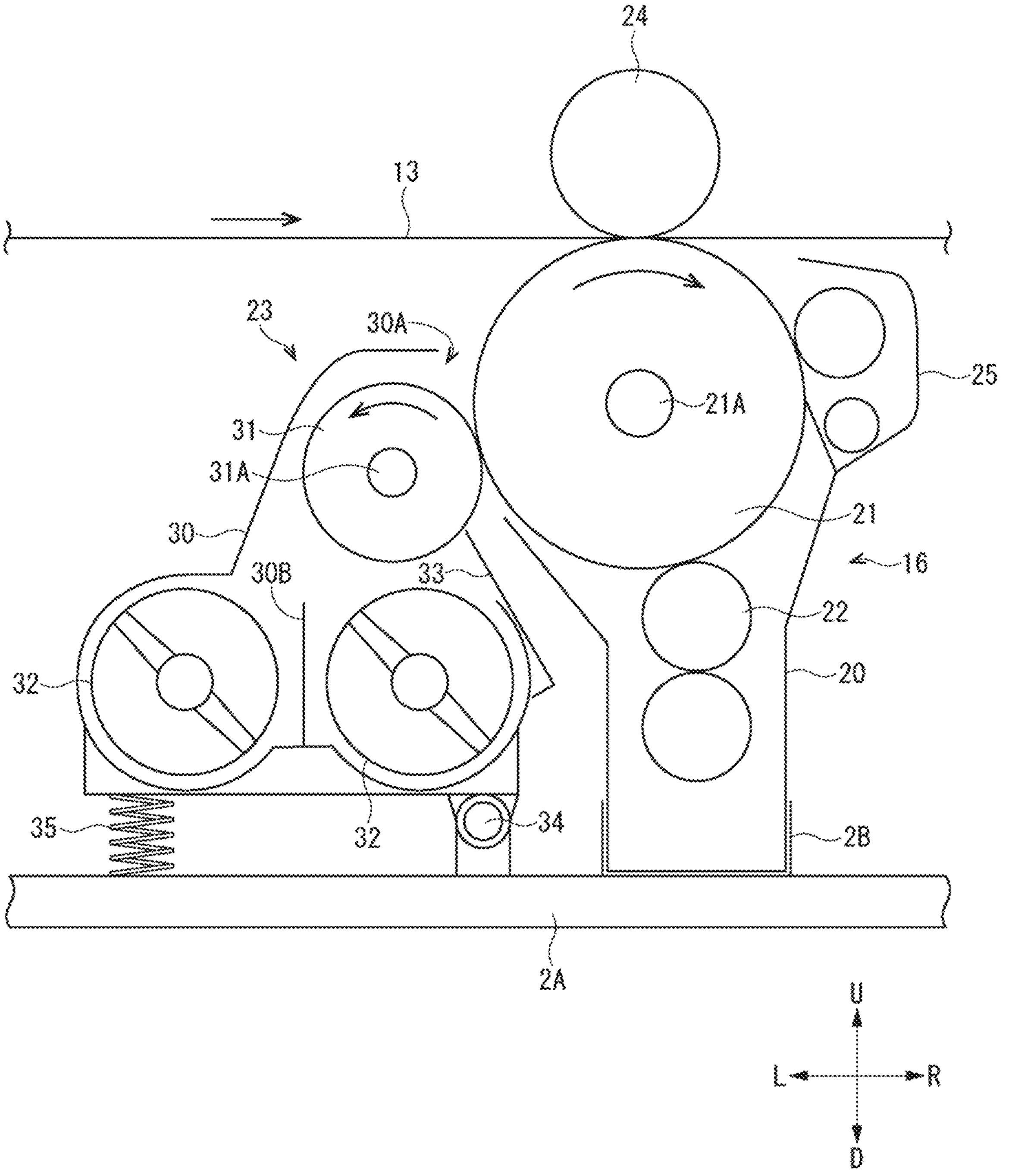
FIG. 4 is a front cross-sectional view schematically showing an internal configuration of the photoconductor unit and the developing device according to the embodiment of the disclosure.

Referring now to FIG. 1 to FIG. 4, the photoconductor unit 16 and the developing device 23 will be described hereunder. FIG. 2 is a perspective view showing the photoconductor unit 16. FIG. 3 is a perspective view showing the developing device 23. FIG. 4 is a front cross-sectional view schematically showing the internal configuration of the photoconductor unit 16 and the developing device 23.

Photoconductor Unit

As shown in FIG. 1, FIG. 2, and FIG. 4, the photoconductor unit 16 is a unified component including the photoconductor drum 21, the charging device 22, and the cleaning device 25, which are accommodated in a photoconductor housing 20. The photoconductor housing 20 is, for example, formed of a synthetic resin, in a box shape extending in the front-rear direction (axial direction). The photoconductor housing 20 supports the photoconductor drum 21 so as to rotate about the shaft. The main body 2 includes a support frame 2A, and a housing base 2B, in which the bottom portion of the photoconductor housing 20 is fitted, is provided on the support frame 2A (see FIG. 4). The photoconductor drum 21 is formed in a circular column shape, extending in the front-rear direction (axial direction). The rotary shaft 21A of the photoconductor drum 21 is supported by non-illustrated bearings, provided on the respective end portions of the photoconductor housing 20 in the front-rear direction. The end portions of the rotary shaft 21A in the front-rear direction are protruding outward, from the respective end portions of the photoconductor housing 20 in the front-rear direction (see FIG. 2). The charging device 22 is in contact with the photoconductor drum 21 on the lower side, and the cleaning device 25 is in contact with the photoconductor drum 21 on the right side (see FIG. 4).

Developing Device

As shown in FIG. 3 and FIG. 4, the developing device 23 is a unified component including two screws 32 and a developing roller 31, which are accommodated in a developing housing 30.

Developing Housing

The developing housing 30 is, for example, formed of a synthetic resin, in a box shape extending in the front-rear direction (axial direction). The developing agent is stored in the bottom portion of the developing housing 30. The developing agent is, for example, a two-component developing agent containing a magnetic carrier and a non-magnetic toner. The developing housing 30 supports the two screws 32 and the developing roller 31, so as to rotate about the respective shafts. An opening 30A, through which a part of the outer circumferential surface of the developing roller 31 is exposed, is formed on the right upper portion of the developing housing 30. A blade 33, for regulating the layer thickness of the developing agent retained on the developing roller 31, is provided close to the lower edge of the opening 30A.

Screws

As shown in FIG. 4, the two screws 32 are aligned in the left-right direction on the bottom portion inside the developing housing 30, and extend in the front-rear direction (axial direction), generally parallel to each other. The developing housing 30 includes a partition wall 30B, separating the two screws 32 from each other. Non-illustrated gaps, for allowing the developing agent to flow through, are provided on the respective sides of the partition wall 30B in the front-rear direction. The two screws 32 transport the developing agent, in opposite directions to each other. The developing agent circulates inside the lower portion of the developing housing 30, by being stirred by the two screws 32. The toner is frictionally charged, because of the developing agent being stirred by the screws 32.

Developing Roller

The developing roller 31 is located on the upper side of the screw 32 on the right side, and extends in the front-rear direction (axial direction), generally parallel to the screw 32. The developing roller 31 includes a permanent magnet covered with a non-magnetic sleeve, so as to be formed in a circular column shape as a whole. The rotary shaft 31A of the developing roller 31 is supported by non-illustrated bearings, provided on the respective end portions of the developing housing 30 in the front-rear direction. The end portions of the rotary shaft 31A in the front-rear direction are protruding outward, from the respective end portions of the developing housing 30 in the front-rear direction (see FIG. 3). The (surface of the) developing roller 31 is exposed through the opening 30A, and opposed to the (surface of the) photoconductor drum 21, generally parallel thereto. The developing roller 31 retains the developing agent, which forms a magnetic brush on the surface of the developing roller 31. The magnetic brush has its layer thickness regulated by the blade 33.

As shown in FIG. 4, the developing housing 30 is supported by the support frame 2A, so as to pivot about a fulcrum 34 provided at the right lower position of the developing housing 30. The left lower portion of the developing housing 30 is connected to the support frame 2A, via a biasing member 35. The biasing member 35 is, for example, a compression coil spring, biasing the developing housing 30 upward. By being urged by the biasing member 35, the developing housing 30 is made to pivot about the fulcrum 34, toward the photoconductor unit 16 (photoconductor drum 21) (clockwise in FIG. 4). Accordingly, the developing roller 31 comes close to (makes contact with) the photoconductor drum 21. On the other hand, when the developing housing 30 pivots counterclockwise about the fulcrum 34, thereby compressing the biasing member 35, the developing roller 31 is spaced from the photoconductor drum 21.

Now, in order to develop a proper toner image from the latent image retained on the photoconductor drum 21, it is essential to keep the clearance (distance) between the photoconductor drum 21 and the developing roller 31 uniform, over the entire length in the front-rear direction (axial direction). Therefore, the image forming apparatus 1 according to this embodiment includes a clearance adjustment mechanism 18 that adjusts the clearance between the photoconductor drum 21 and the developing roller 31. The term "uniform" used herein does not necessarily mean being perfectly equal, but permits a slight deviation (error) that is small enough to keep the image quality unaffected.

Clearance Adjustment Mechanism

Figure 5:
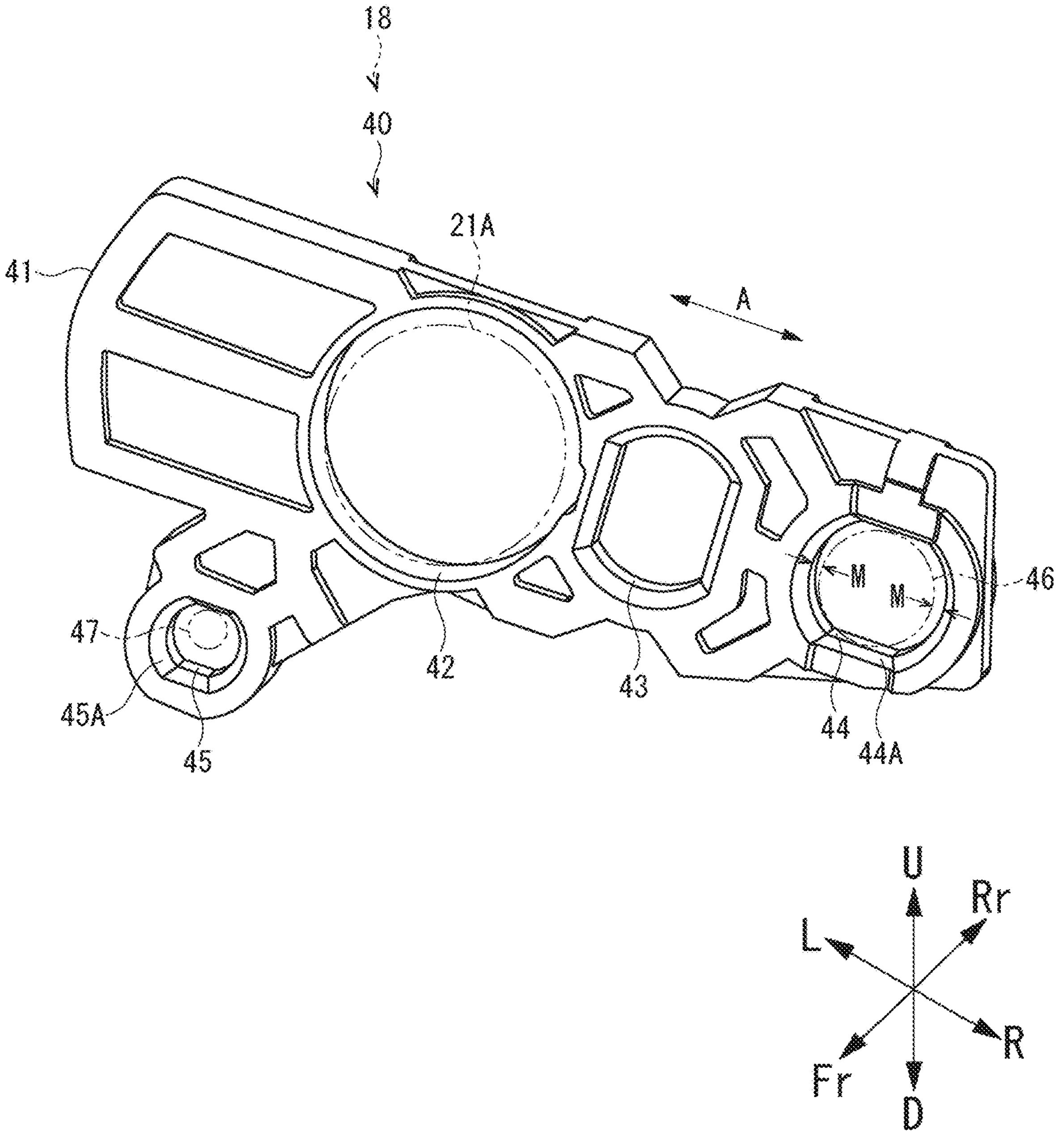
FIG. 5 is a perspective view showing a first contact member according to the embodiment of the disclosure.
Figure 6:
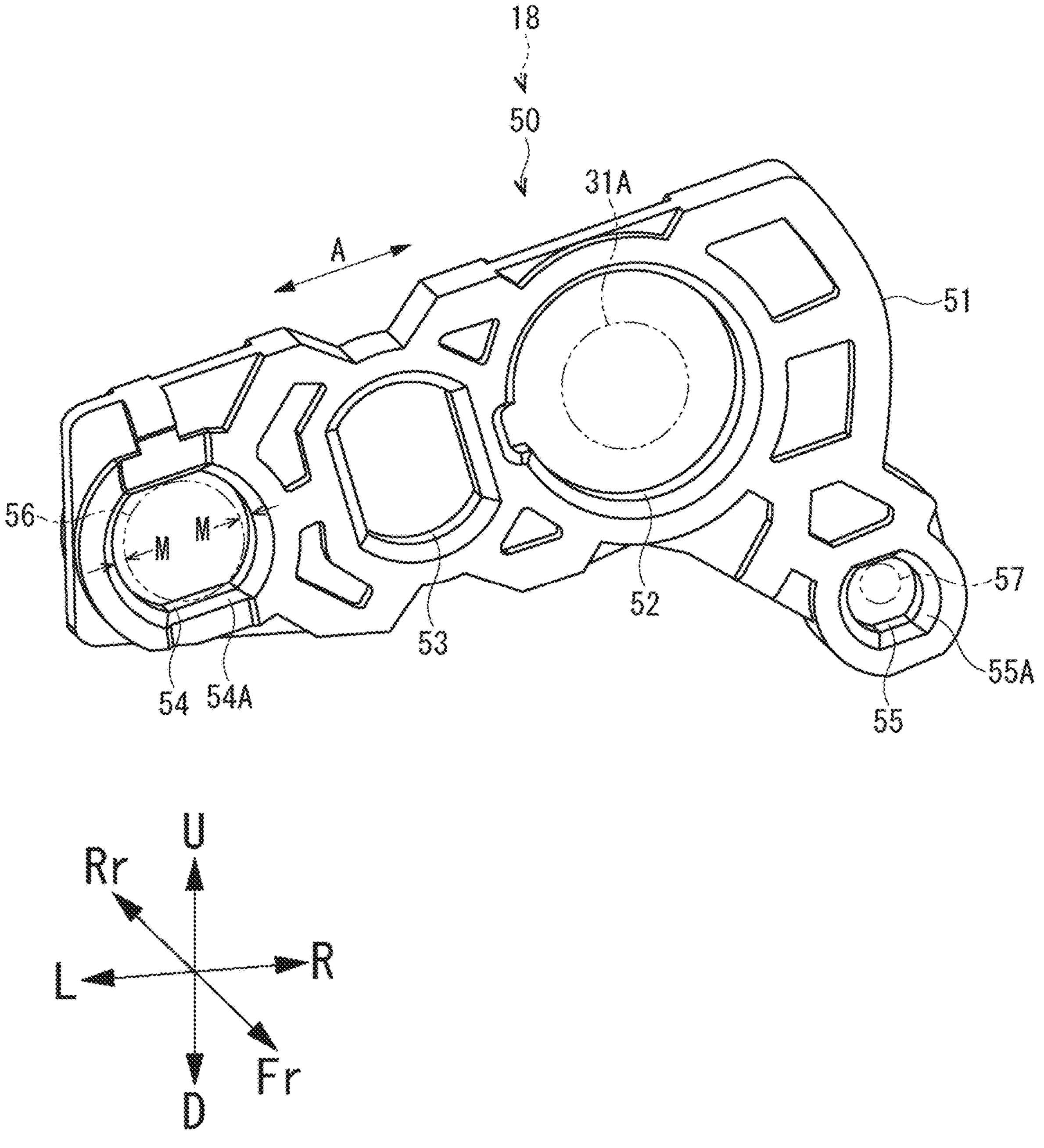
FIG. 6 is a perspective view showing a second contact member according to the embodiment of the disclosure.
Figure 7:
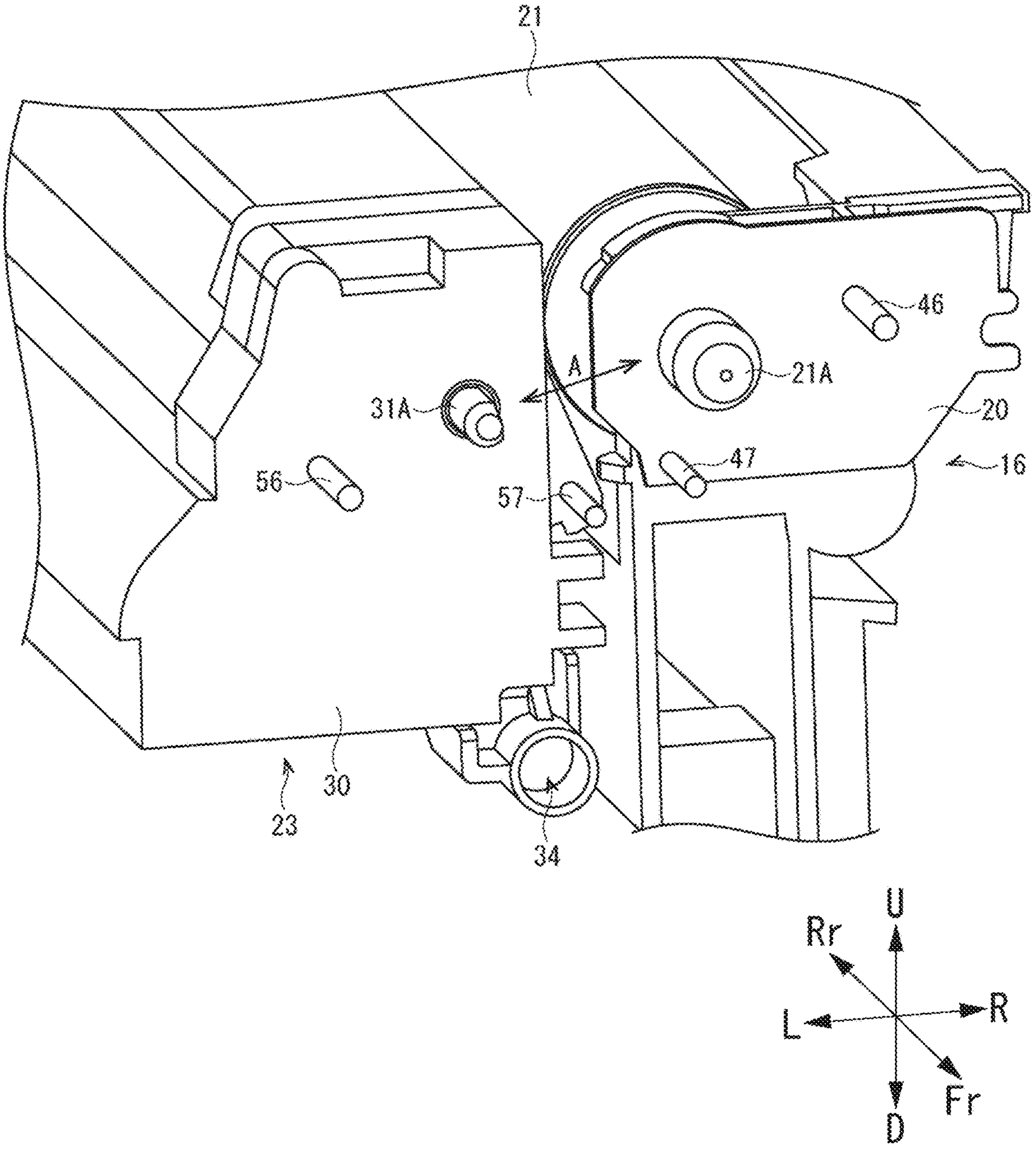
FIG. 7 is a perspective view showing a front end portion of the photoconductor unit and the developing device according to the embodiment of the disclosure.
Figure 8:
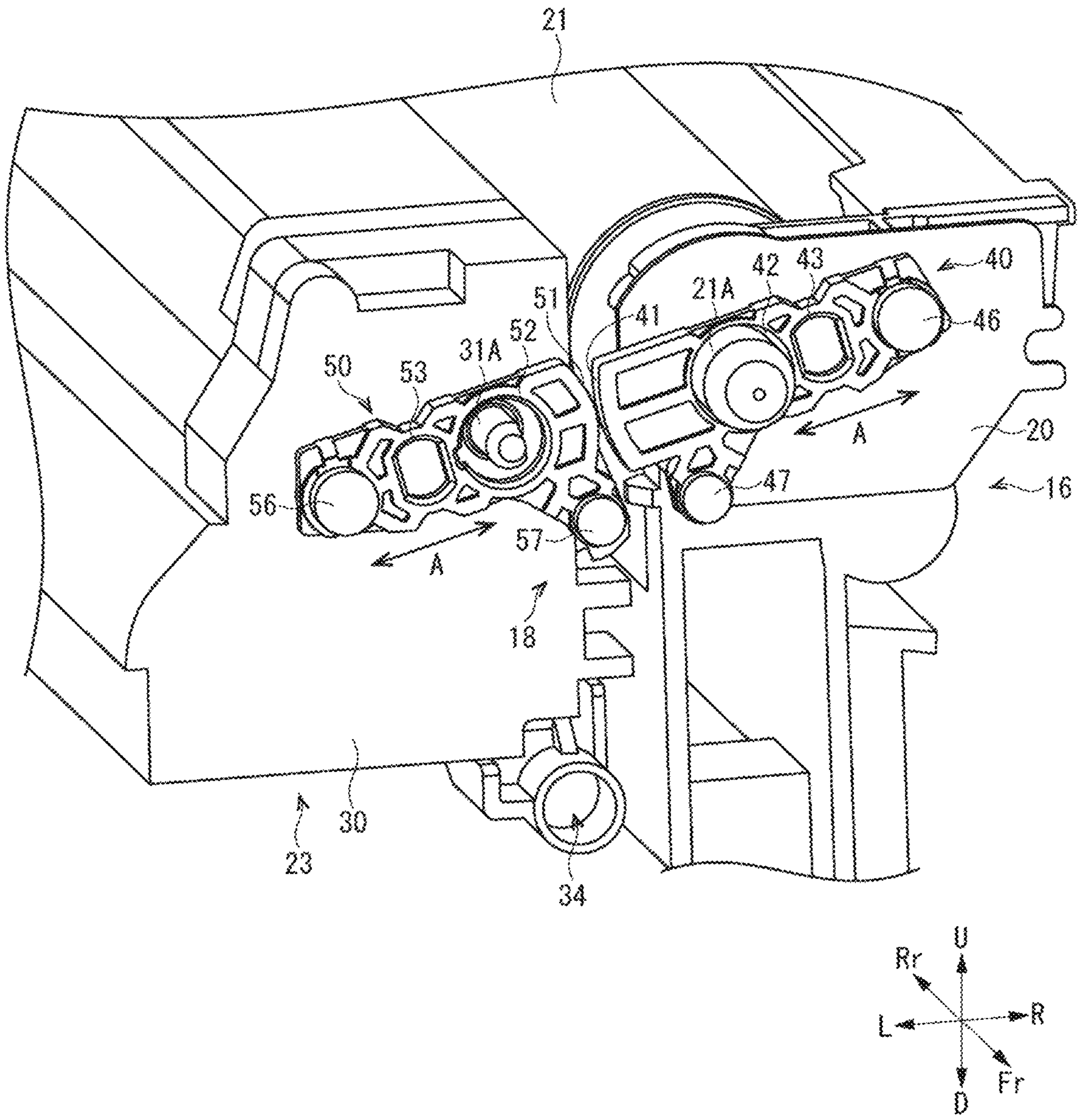
FIG. 8 is a perspective view showing a clearance adjustment mechanism according to the embodiment of the disclosure.

Referring now to FIG. 5 to FIG. 8, the clearance adjustment mechanism 18 will be described hereunder. FIG. 5 is a perspective view showing the first contact member 40. FIG. 6 is a perspective view showing the second contact member 50. FIG. 7 is a perspective view showing the front end portion of the photoconductor unit 16 and the developing device 23. FIG. 8 is a perspective view showing the clearance adjustment mechanism 18.

The clearance adjustment mechanism 18 includes a pair of first contact members 40, provided at the respective end portions of the photoconductor housing 20 in the front-rear direction (axial direction), and a pair of second contact members 50, provided at the respective end portions of the developing housing 30 in the front-rear direction. Here, the pair of first contact members 40 are formed in symmetrical shapes in the front-rear direction, and therefore the description given herein primarily focuses on one (on the front side) of the first contact members 40. Likewise, the description given herein primarily focuses on one (on the front side) of the second contact members 50. In addition, in the case of collectively describing the first contact member 40 and the second contact member 50, the terms "first" and "second" will be omitted, and an expression "contact members 40, 50" will be adopted. Likewise, the term "first" or "second" will also be omitted from the elements accompanied with "first" or "second", as the case may be. Further, in the case of collectively describing the photoconductor housing 20 and the developing housing 30, an expression "housing 20, 30" will be adopted. The end portions of the photoconductor unit 16 in the front-rear direction are configured generally in the same way, except for a slight difference, and therefore FIG. 7 and FIG. 8 only illustrate the front end portion of the photoconductor unit 16. Likewise, FIG. 7 and FIG. 8 only illustrate the front end portion of the developing device 23.

As shown in FIG. 5, FIG. 6, and FIG. 8, the first contact member 40 and the second contact member 50 are each formed in a generally rectangular plate shape, extending in a back-and-forth direction A parallel to a straight line connecting the axial center of the photoconductor drum 21 (rotary shaft 21A) and the axial center of the developing roller 31 (rotary shaft 31A). In this embodiment, since the rotary shaft 21A of the photoconductor drum 21 is located at a slightly upper position with respect to the rotary shaft 31A of the developing roller 31, the back-and-forth direction A slightly inclined upward, in the direction from the developing roller 31 toward the photoconductor drum 21 (see, for example, FIG. 8). Therefore, the first contact member 40 and the second contact member 50 are provided in an inclined posture, along the back-and-forth direction A (see, for example, FIG. 8).

First Contact Member

As shown in FIG. 5, the first contact member 40 includes a first contact surface 41, formed on the left end portion in FIG. 5, such that the central portion in the up-down direction bulges to the left in an arcuate shape. The first contact member 40 also includes a first opening 42, a first jig slot 43, and a first elongate slot 44, aligned in this order from the left to the right in FIG. 5. In addition, the first contact member 40 includes a portion protruding downward in FIG. 5, from a position between the first contact surface 41 and the first opening 42, and a first elongate slot 45 is formed in this protruding portion. The first opening 42, the first jig slot 43, and the first elongate slots 44, 45 are each formed so as to penetrate through the first contact member 40, in the thickness direction (front-rear direction). Here, although the first elongate slot 44 is larger than the first elongate slot 45 in this embodiment, the size of the first elongate slots 44, 45 may be changed as desired.

The first opening 42 is formed in a generally circular shape, and has an inner diameter slightly larger than the outer diameter of the rotary shaft 21A of the photoconductor drum 21. The first jig slot 43 is a generally elliptical (generally rectangular) elongate hole, having the major axis extending in the direction orthogonal to the back-and-forth direction A, in other words in generally up-down direction.

The first elongate slots 44, 45 are each a generally elliptical (generally rectangular) elongate hole, having the major axis extending in the back-and-forth direction A (generally left-right direction). The first elongate slots 44, 45 each include arcuate curved surfaces opposing in the back-and-forth direction A, and flat surfaces opposing in the direction orthogonal to the back-and-forth direction A. The flat surfaces are generally parallel to the back-and-forth direction A. The first elongate slots 44, 45 each include a first tapered portion 44A, 45A, formed by chamfering the peripheral edge on the front side (opposite to the side to be in contact with the end portion of the photoconductor housing 20). The first tapered portions 44A, 45A are each formed such that the diameter (major axis and minor axis) gradually decreases, from the front side of the first elongate slots 44, 45 to the generally central position thereof in the axial direction (front-rear direction). The rear side of each of the first elongate slots 44, 45 (the side of the contact surface to be in contact with the end portion of the photoconductor housing 20) is formed in a generally cylindrical shape, and the front side of each of the first elongate slots 44, 45 is formed in a generally conical shape, widened by the first tapered portion 44A, 45A.

First Bonding Projection

As shown in FIG. 7, the photoconductor housing 20 includes a pair of first bonding projections 46 and a pair of first bonding projections 47, projecting outward from the respective end portions in the front-rear direction (axial direction). Here, the pair of first bonding projections 46 are formed in symmetrical shapes in the front-rear direction, and therefore the description given herein primarily focuses on one (on the front side) of the first bonding projections 46. Likewise, the description given herein primarily focuses on one (on the front side) of the first bonding projections 47. In addition, although the first bonding projection 46 is larger in diameter than the first bonding projection 47 in this embodiment, the diameter of the first bonding projections 46, 47 may be changed as desired.

The first bonding projections 46, 47 are, for example, formed of a thermoplastic synthetic resin, and formed integrally with the photoconductor housing 20. The first bonding projections 46, 47 are located at the positions respectively corresponding to the first elongate slots 44, 45 of the first contact member 40. The first bonding projections 46, 47 are formed in a generally cylindrical shape, of a size that allows the first elongate slots 44, 45 to be inserted with a play. The first bonding projections 46, 47 are longer than the thickness of the first contact member 40 (size in the front-rear direction). The first elongate slot 44 is longer than the diameter of the first bonding projection 46, in the back-and-forth direction A, and the first elongate slot 45 is longer than the diameter of the first bonding projection 47, in the back-and-forth direction A (see FIG. 5). Here, the first bonding projections 46, 47 may be formed of the same synthetic resin as that of the photoconductor housing 20, or a different synthetic resin from that of the photoconductor housing 20.

As will be subsequently described in further detail, the end portion of the rotary shaft 21A of the photoconductor drum 21 is inserted in the first opening 42 of the first contact member 40. The first bonding projections 46, 47 are inserted in the first elongate slots 44, 45 of the first contact member 40, respectively. In FIG. 5, the rotary shaft 21A and the first bonding projections 46, 47 are indicated by dash-dot-dot lines. The first bonding projections 46, 47 are located at the generally central position of the first elongate slots 44, 45, respectively, in the back-and-forth direction A (left-right direction), and an adjustment margin M (in FIG. 5, only marked in the first elongate slot 44) is provided on both sides of each of the first bonding projections 46, 47 in the back-and-forth direction A. In addition, a gap wider than the adjustment margin M is provided between the first opening 42 and the rotary shaft 21A of the photoconductor drum 21, along the entire circumference.

Second Contact Member

The second contact member 50 is formed in generally the same shape as the first contact member 40. As shown in FIG. 6, the second contact member 50 includes a second contact surface 51, formed on the left end portion in FIG. 5, such that the central portion in the up-down direction bulges to the right in an arcuate shape. The second contact member 50 also includes a second opening 52, a second jig slot 53, and a second elongate slot 54, aligned in this order from the right to the left in FIG. 6. In addition, the second contact member 50 includes a portion protruding downward in FIG. 6, from a position between the second contact surface 51 and the second opening 52, and a second elongate slot 55 is formed in this protruding portion. The second opening 52, the second jig slot 53, and the second elongate slots 54, 55 are each formed so as to penetrate through the second contact member 50, in the thickness direction (front-rear direction). Here, although the second elongate slot 54 is larger than the second elongate slot 55 in this embodiment, the size of the second elongate slots 54, 55 may be changed as desired.

The second opening 52 is formed in a generally circular shape, and has an inner diameter slightly larger than the outer diameter of the rotary shaft 31A of the developing roller 31. The second jig slot 53 is a generally elliptical (generally rectangular) elongate hole, having the major axis extending in the direction orthogonal to the back-and-forth direction A, in other words in generally up-down direction. Here, the distance between the second contact surface 51 and the second opening 52 is shorter than the distance between the first contact surface 41 and the first opening 42.

The second elongate slots 54, 55 are each a generally elliptical (generally rectangular) elongate hole, having the major axis extending in the back-and-forth direction A (generally left-right direction). The second elongate slots 54, 55 each include arcuate curved surfaces opposing in the back-and-forth direction A, and flat surfaces opposing in the direction orthogonal to the back-and-forth direction A. The flat surfaces are generally parallel to the back-and-forth direction A. The second elongate slots 54, 55 each include a second tapered portion 54A, 55A, formed by chamfering the peripheral edge on the front side (opposite to the side to be in contact with the end portion of the developing housing 30). The second tapered portions 54A, 55A are each formed such that the diameter (major axis and minor axis) gradually decreases, from the front side of the second elongate slots 54, 55 to the generally central position thereof in the axial direction (front-rear direction). The rear side of each of the second elongate slots 54, 55 (the side of the contact surface to be in contact with the end portion of the developing housing 30) is formed in a generally cylindrical shape, and the front side of each of the second elongate slots 54, 55 is formed in a generally conical shape, widened by the second tapered portion 54A, 55A.

Second Bonding Projection

As shown in FIG. 7, the developing housing 30 includes a pair of second bonding projections 56 and a pair of second bonding projections 57, projecting outward from the respective end portions in the front-rear direction (axial direction). Here, the pair of second bonding projections 56 are formed in symmetrical shapes in the front-rear direction, and therefore the description given herein primarily focuses on one (on the front side) of the second bonding projections 56. Likewise, the description given herein primarily focuses on one (on the front side) of the second bonding projections 57. In addition, although the second bonding projection 56 is larger in diameter than the second bonding projection 57 in this embodiment, the diameter of the second bonding projections 56, 57 may be changed as desired.

The second bonding projections 56, 57 are, for example, formed of a thermoplastic synthetic resin, and formed integrally with the developing housing 30. The second bonding projections 56, 57 are located at the positions respectively corresponding to the second elongate slots 54, 55 of the second contact member 50. The second bonding projections 56, 57 are formed in a generally cylindrical shape, of a size that allows the second elongate slots 54, 55 to be inserted with a play. The second bonding projections 56, 57 are longer than the thickness of the second contact member 50 (size in the front-rear direction). The second elongate slot 54 is longer than the diameter of the second bonding projection 56, in the back-and-forth direction A, and the second elongate slot 55 is longer than the diameter of the second bonding projection 57, in the back-and-forth direction A (see FIG. 5). Here, the second bonding projections 56, 57 may be formed of the same synthetic resin as that of the developing housing 30, or a different synthetic resin from that of the developing housing 30.

As will be subsequently described in further detail, the end portion of the rotary shaft 31A of the developing roller 31 is inserted in the second opening 52 of the second contact member 50. The second bonding projections 56, 57 are inserted in the second elongate slots 54, 55 of the second contact member 50, respectively. In FIG. 6, the rotary shaft 31A and the second bonding projections 56, 57 are indicated by dash-dot-dot lines. The second bonding projections 56, 57 are located at the generally central position of the second elongate slots 54, 55, respectively, in the back-and-forth direction A (left-right direction), and an adjustment margin M (in FIG. 6, only marked in the second elongate slot 54) is provided on both sides of each of the second bonding projections 56, 57 in the back-and-forth direction A. In addition, a gap wider than the adjustment margin M is provided between the second opening 52 and the rotary shaft 31A of the developing roller 31, along the entire circumference.

Clearance Adjustment Between Photoconductor Drum and Developing Roller

Figure 9:
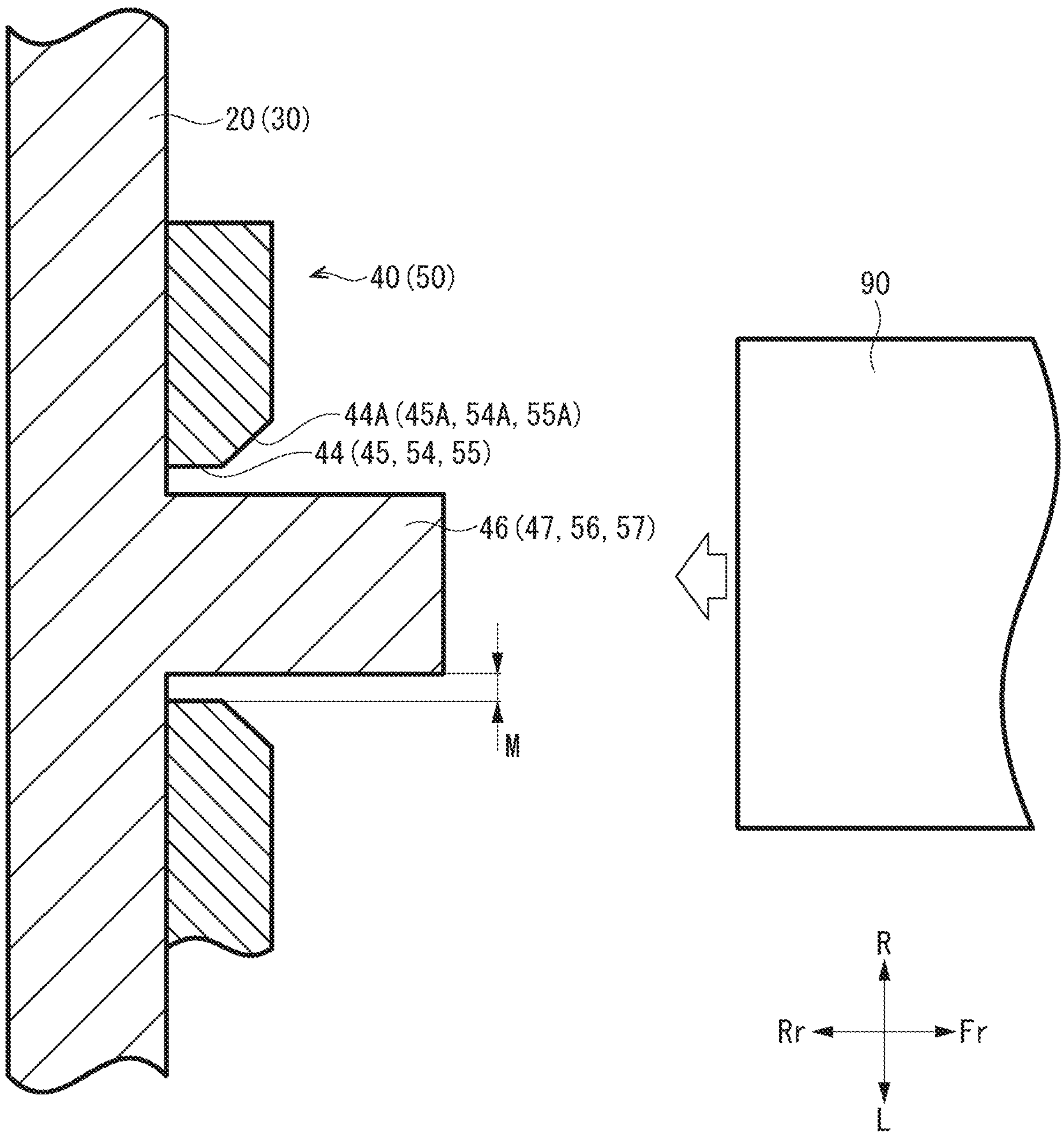
FIG. 9 is a cross-sectional view schematically showing a process of bonding a first bonding projection to the first contact member, according to the embodiment of the disclosure.
Figure 10:
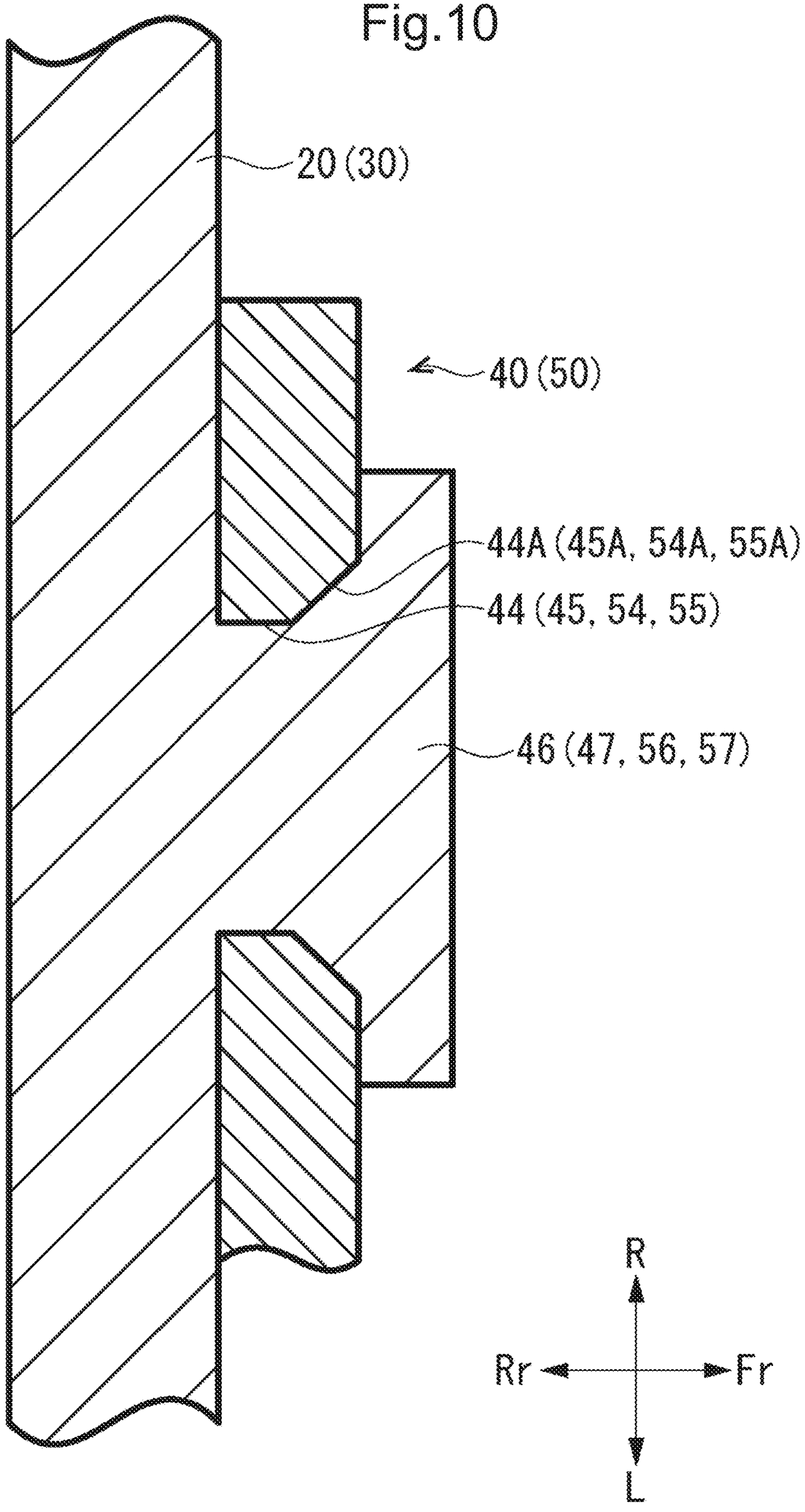
FIG. 10 is a cross-sectional view schematically showing the first bonding projection bonded to the first contact member, according to the embodiment of the disclosure.

Referring now to FIG. 8 to FIG. 10, the process of fixing the contact members 40 and 50 to the housings 20 and 30, and adjusting the clearance between the photoconductor drum 21 and the developing roller 31, will be described hereunder. FIG. 9 is a cross-sectional view schematically showing the process of bonding the first bonding projection

46 to the first contact member 40. FIG. 10 is a cross-sectional view schematically showing the first bonding projection 46 bonded to the first contact member 40. Here, it will be assumed that the photoconductor unit 16 and the developing device 23 have already been assembled. In addition, the process of bonding the bonding projections 46, 47, 56, and 57 to the contact members 40, 50, and the bonded states thereof, are generally the same, and therefore FIG. 9 and FIG. 10 only illustrate the first elongate slot 44 of the first contact member 40, and the first bonding projection 46.

First, the operator places the photoconductor unit 16 and the developing device 23 on non-illustrated exclusive working tables, respectively prepared for the assembly work. The operator then locates the first contact member 40 on the end portion of the photoconductor housing 20 in the front-rear direction, inserts the rotary shaft 21A through the first opening 42, and inserts the first bonding projections 46, 47 through the first elongate slots 44, 45, respectively. The operator also locates the second contact member 50 on the end portion of the developing housing 30 in the front-rear direction, inserts the rotary shaft 31A through the second opening 52, and inserts the second bonding projections 56, 57 through the second elongate slots 54, 55, respectively. The bonding projections 46, 47, 56, and 57 each protrude outward, from the surface of the contact members 40, 50 (see FIG. 9). Here, the photoconductor unit 16 and the developing device 23 may each be independently assembled.

Then the operator inserts a non-illustrated jig, in each of the first jig slot 43 and the second jig slot 53. With the jig inserted in the jig slot 43, 53, the contact members 40, 50 can each be moved in the back-and-forth direction A, within the range corresponding to the adjustment margin M with respect to the bonding projections 46, 47, 56, and 57. Accordingly, when the photoconductor unit 16 is set on the housing base 2B on the support frame 2A, and the developing device 23 is set on the support frame 2A via the fulcrum 34 and the biasing member 35, the second contact surface 51 of the second contact member 50 makes contact with the first contact surface 41 of the first contact member 40, thus to be positioned such that the clearance between the photoconductor drum 21 and the developing roller 31 becomes appropriate (see FIG. 8).

Thereafter, the operator applies an ultrasonic horn 90 on each of the bonding projections 46, 47, 56, and 57, protruding outward from the elongate slots 44, 45, 54, and 55 respectively, of the contact members 40, 50 (see FIG. 9), thereby bonding the bonding projections 46, 47, 56, and 57 to the contact members 40, 50 (ultrasonic bonding) (see FIG. 8 and FIG. 10). After filling the elongate slots 44, 45, 54, and 55 by being molten, the bonding projections 46, 47, 56, and 57 are hardened, by being cooled, in close contact with the inner circumferential surface of the elongate slots 44, 45, 54, and 55 (see FIG. 10). The first bonding projections 46, 47 thus bonded are filled in the first elongate slots 44, 45, the first tapered portions 44A, 45A inclusive (see FIG. 10). In addition, the first bonding projections 46, 47 become larger in diameter than the first elongate slots 44, 45 (first tapered portions 44A, 45A), on the surface of the first contact member 40, thereby holding the first contact member 40 between the first bonding projections 46, 47 and the end portion of the photoconductor housing 20 in the front-rear direction (axial direction) (see FIG. 10). Likewise, the second bonding projection 56, 57 bonded as above are filled in the second elongate slots 54, 55, the second tapered portions 54A, 55A inclusive. In addition, the second bonding projection 56, 57 become larger in diameter than the second elongate slots 54, 55 (second tapered portions 54A, 55A), on the surface of the second contact member 50, thereby holding the second contact member 50 between the second bonding projection 56, 57 and the end portion of the developing housing 30 in the front-rear direction (axial direction). Here, the bonding projections 46, 47, 56, and 57 radially spread over the surface of the contact members 40, 50 are formed in a generally circular disk shape (see FIG. 8).

Through the mentioned process, the contact members 40, 50 are fixed to the housings 20, 30, at the adjusted positions (see FIG. 8). Since the developing housing 30 is biased toward the photoconductor housing 20 by the biasing member 35, the second contact surface 51 of the second contact member 50 makes contact (with pressure) with the first contact surface 41 of the first contact member 40. Accordingly, the clearance between the photoconductor drum 21 and the developing roller 31 can be maintained in the appropriately adjusted state. Here, the term "bonding" herein used refers to a bonding technique that disables the bonded interface from being identified from appearance, after the bonding is done. In addition, although the bonding projections 46, 47, 56, and 57 are ultrasonically bonded in this embodiment, a different bonding technique may be employed, such as high-frequency bonding or thermal bonding.

In the case of the image forming apparatus 1 according to this embodiment, the contact members 40, 50 are fixed to the housings 20, 30, by bonding the bonding projections 46, 47, 56, and 57, inserted through the elongate slots 44, 45, 54, and 55, to the contact member 40, 50 (see FIG. 8). Such an arrangement enables the contact members 40, 50 to be fixed to the housings 20, 30, without the need to exert an external force, such as a rotational force of a screw, to the contact members 40, 50. Accordingly, for example in the case where the contact members 40, 50 are fixed to the housings 20, 30 with screws, the contact members 40, 50 can be prevented from being rotated by the rotational force for fastening the screws, and therefore the contact members 40, 50 can be attached to the appropriate positions. Consequently, the clearance between the photoconductor drum 21 and the developing roller 31 can be made uniform, over the entire length along the axial direction.

In the image forming apparatus 1 according to this embodiment, the bonding projections 46, 47, 56, and 57 are completely filled in the elongate slots 44, 45, 54, and 55, after being bonded (see FIG. 10). Therefore, the contact members 40, 50 can be prevented from being displaced in the back-and-forth direction A. In addition, the bonding projections 46, 47, 56, and 57 that have radially spread over the surface of the contact member 40, 50 hold the contact members 40, 50 between the mentioned bonding projections and the housings 20, 30 (see FIG. 10). Therefore, the contact members 40, 50 can also be prevented from being displaced in the front-rear direction (axial direction). The mentioned configurations allow the first contact member 40 and the second contact member 50, firmly fixed to the housings 20, 30 respectively, to be abutted against each other, thereby enabling the distance (clearance) between the photoconductor drum 21 and the developing roller 31 to remain uniform.

In the image forming apparatus 1 according to this embodiment, in addition, the elongate slots 44, 45, 54, and 55 include the tapered portions 44A, 45A, 54A, and 55A (see FIG. 5 and FIG. 6), and therefore the bonding projections 46, 47, 56, and 57, and the inner circumferential surface of the elongate slots 44, 45, 54, and 55 (tapered portions 44A, 45A, 54A, and 55A inclusive), bonded together, are brought into close contact with each other, over a larger area. Accordingly, the contact members 40, 50 can be more firmly fixed to the housing 20, 30, and therefore the force pressing the developing housing 30 against the photoconductor housing 20 can be surely received by the contact members 40, 50, without loss.

In the case of the existing image forming apparatuses, not configured as the foregoing embodiment, the contact members are fixed to the respective housings with screws, and therefore the contact members may be made to rotate by the rotational force for fastening the screws, thus to be shifted from the appropriate position. Therefore, it is difficult to uniformly set the clearance between the photoconductor drum and the developing roller, along the axial direction. With the configuration according to the foregoing embodiment, in contrast, the clearance between the photoconductor drum and the developing roller can be set uniform, along the axial direction.

Although the first contact member 40 and the second contact member 50 are both bonded to the housings 20, 30, in the image forming apparatus 1 according to the foregoing embodiment, the disclosure is not limited thereto. For example, only the first contact member 40 may be bonded to the photoconductor housing 20, and screw holes may be formed, instead of the second bonding projections 56, 57, in the end portion of the developing housing 30 in the axial direction, at the positions corresponding to the second bonding projection 56, 57, to fix the second contact member 50 to the developing housing 30 with screws (not shown). In this case, preferably, the first bonding projections 46, 47 may be bonded to the first contact member 40, after the second contact member 50 is fixed to the developing housing 30 with the screws. Conversely, for example, only the second contact member 50 may be bonded to the developing housing 30, and screw holes may be formed, instead of the first bonding projections 46, 47, in the end portion of the photoconductor housing 20 in the axial direction, at the positions corresponding to the first bonding projections 46, 47, to fix the first contact member 40 to the photoconductor housing 20 with screws (not shown). In this case, preferably, the second bonding projections 56, 57 may be bonded to the second contact member 50, after the first contact member 40 is fixed to the photoconductor housing 20 with the screws.

Although two first elongate slots 44, 45 are formed in the first contact member 40, in the image forming apparatus 1 according to the foregoing embodiment, it suffices that at least one first elongate slot 44 is formed. Likewise, in the second contact member 50 also, it suffices that at least one second elongate slot 54 is formed.

Although the tapered portions 44A, 45A, 54A, and 55A are formed on the elongate slots 44, 45, 54, and 55, in the image forming apparatus 1 according to the foregoing embodiment, the disclosure is not limited thereto. At least one of the first tapered portions 44A, 45A, and the second tapered portions 54A, 55A, may be excluded (not shown). In addition, although the bonding projections 46, 47, 56, and 57 that have radially spread over the surface of the contact members 40, 50 are formed in the circular disk shape, such bonding projections may be formed in a dome shape, or a polygonal disk shape, by modifying the shape of the ultrasonic horn 90 (not shown).

In addition, although the rotary shaft 21A of the photoconductor drum 21 is inserted in the first opening 42 of the first contact member 40, in the image forming apparatus 1 according to the foregoing embodiment, the disclosure is not limited thereto. The first contact member 40 may be fixed to the photoconductor housing 20, so as not to interfere with the rotary shaft 21A (not shown). In this case, the first opening 42 may be excluded (not shown). Likewise, the second contact member 50 may be fixed to the developing housing 30, so as not to interfere with the rotary shaft 31A of the developing roller 31, and the second opening 52 may be excluded (not shown).

Further, the shapes and positions of the openings 42, 52, the elongate slots 44, 45, 54, and 55, the jig slots 43, 53 of the contact members 40, 50, defined in the foregoing embodiment, are merely exemplary, and may be modified as desired. In addition, although the first contact member 40 and the second contact member 50 are partially different in shape from each other, in the embodiment, the first contact member 40 and the second contact member 50 may be formed in the identical shape, to save the manufacturing cost (not shown).

Further, although the biasing member 35 is pressing the developing housing 30 toward the photoconductor housing 20, in the image forming apparatus 1 according to the foregoing embodiment, the disclosure is not limited thereto. For example, an eccentric cam or a magnetic spring may be employed, instead of the biasing member 35, or the developing housing 30 may be configured so as to be pressed against the photoconductor housing 20, by gravity (neither shown).

Still further, although the image forming apparatus 1 is exemplified by the color printer in the embodiment, the image forming apparatus 1 may be a monochrome printer, a copier, a facsimile machine, a multifunction peripheral, or the like.

The foregoing embodiment merely represents an exemplary aspect of the image forming apparatus according to the disclosure, and the technical scope of the disclosure is in no way limited to the embodiment. The disclosure may be modified in various manners without departing from the scope and the spirit of the technical idea of the disclosure, and the appended claims encompass all the aspects that may be included in the technical idea.

While the present disclosure has been described in detail with reference to the embodiments thereof, it would be apparent to those skilled in the art that the various changes and modifications may be made therein within the scope defined by the appended claims.

What is claimed is:

1. An image forming apparatus comprising:

a photoconductor drum that retains a latent image;

a photoconductor housing that supports the photoconductor drum so as to rotate about a shaft;

a developing roller that retains a developing agent;

a developing housing that supports the developing roller, so as to oppose the photoconductor drum, and to rotate about a shaft;

a pair of first contact members provided on respective end portions of the photoconductor housing in an axial direction, in which the photoconductor drum extends; and a pair of second contact members provided on respective end portions of the developing housing in the axial direction, and configured to make contact with the respective first contact members, by pressing the developing housing toward the photoconductor housing, wherein the photoconductor housing includes a pair of first bonding projections, projecting outward from the respective end portions in the axial direction, the first contact member includes a first elongate slot, longer than a diameter of the first bonding projection in a back-and-forth direction, parallel to a straight line connecting an axial center of the photoconductor drum and an axial center of the developing roller, and the first contact member is fixed to the photoconductor housing, by bonding the first bonding projection, inserted through the first elongate slot, to the first contact member.

2. The image forming apparatus according to claim 1, wherein the first bonding projection fills in the first elongate slot, upon being bonded, becomes larger in diameter than the first elongate slot on a surface of the first contact member, and holds the first contact member between the first bonding projection and the end portion of the photoconductor housing in the axial direction.

3. The image forming apparatus according to claim 2, wherein the first elongate slot includes a first tapered portion formed by chamfering a peripheral edge on a front side, and the first bonding projection that has been bonded fills in the first elongate slot, the first tapered portion inclusive.

4. An image forming apparatus comprising:

a photoconductor drum that retains a latent image;

a photoconductor housing that supports the photoconductor drum so as to rotate about a shaft;

a developing roller that retains a developing agent;

a developing housing that supports the developing roller, so as to oppose the photoconductor drum, and to rotate about a shaft;

a pair of first contact members provided on respective end portions of the photoconductor housing in an axial direction, in which the photoconductor drum extends; and a pair of second contact members provided on respective end portions of the developing housing in the axial direction, and configured to make contact with the respective first contact members, by pressing the developing housing toward the photoconductor housing, wherein the developing housing includes a pair of second bonding projections, projecting outward from the respective end portions in the axial direction, the second contact member includes a second elongate slot, longer than a diameter of the second bonding projection in a back-and-forth direction, parallel to a straight line connecting an axial center of the photoconductor drum and an axial center of the developing roller, and the second contact member is fixed to the developing housing, by bonding the second bonding projection, inserted through the second elongate slot, to the second contact member.

5. The image forming apparatus according to claim 4, wherein the second bonding projection fills in the second elongate slot, upon being bonded, becomes larger in diameter than the second elongate slot on a surface of the second contact member, and holds the second contact member between the second bonding projection and the end portion of the developing housing in the axial direction.

6. The image forming apparatus according to claim 5, wherein the second elongate slot includes a second tapered portion formed by chamfering a peripheral edge on a front side, and the second bonding projection that has been bonded fills in the second elongate slot, the second tapered portion inclusive.

7. An image forming apparatus comprising:

a photoconductor drum that retains a latent image;

a photoconductor housing that supports the photoconductor drum so as to rotate about a shaft;

a developing roller that retains a developing agent;

a developing housing that supports the developing roller, so as to oppose the photoconductor drum, and to rotate about a shaft;

a pair of first contact members provided on respective end portions of the photoconductor housing in an axial direction, in which the photoconductor drum extends; and a pair of second contact members provided on respective end portions of the developing housing in the axial direction, and configured to make contact with the respective first contact members, by pressing the developing housing toward the photoconductor housing, wherein the photoconductor housing includes a pair of first bonding projections, projecting outward from the respective end portions in the axial direction, the developing housing includes a pair of second bonding projections, projecting outward from the respective end portions in the axial direction, the first contact member includes a first elongate slot, longer than a diameter of the first bonding projection in a back-and-forth direction, parallel to a straight line connecting an axial center of the photoconductor drum and an axial center of the developing roller, the second contact member includes a second elongate slot, longer than a diameter of the second bonding projection in the back-and-forth direction, the first contact member is fixed to the photoconductor housing, by bonding the first bonding projection, inserted through the first elongate slot, to the first contact member, and the second contact member is fixed to the developing housing, by bonding the second bonding projection, inserted through the second elongate slot, to the second contact member.

8. The image forming apparatus according to claim 7,

Wherein the first bonding projection fills in the first elongate slot, upon being bonded, becomes larger in diameter than the first elongate slot on a surface of the first contact member, and holds the first contact member between the first bonding projection and the end portion of the photoconductor housing in the axial direction, and the second bonding projection fills in the second elongate slot, upon being bonded, becomes larger in diameter than the second elongate slot on a surface of the second contact member, and holds the second contact member between the second bonding projection and the end portion of the developing housing in the axial direction.

9. The image forming apparatus according to claim 8, wherein the first elongate slot includes a first tapered portion formed by chamfering a peripheral edge on a front side, the first bonding projection that has been bonded fills in the first elongate slot, the first tapered portion inclusive, the second elongate slot includes a second tapered portion formed by chamfering a peripheral edge on a front side, and the second bonding projection that has been bonded fills in the second elongate slot, the second tapered portion inclusive.

10. The image forming apparatus according to claim 7, wherein the first contact member includes a first contact surface, formed on an end portion in an arcuate shape, so as to bulge toward the developing roller and the developing housing, when the first contact member is fixed to the photoconductor housing, the second contact member includes a second contact surface, formed on an end portion to be opposed to the first contact member fixed to the photoconductor housing, when the second contact member is fixed to the developing housing, and in an arcuate shape bulging toward the first contact member, the photoconductor housing having the first contact member fixed thereto is supported by a support frame provided on a main body of the image forming apparatus, the developing housing having the second contact member fixed thereto is supported by the support frame, so as to be made to pivot about a rotary shaft extending in an axial direction of the developing roller, by pressing force of a biasing member located between the developing housing and the support frame, and an end portion of the second contact member is brought into contact with an end portion of the first contact member, because of the photoconductor housing and the developing housing being supported by the support frame.

* * * * *